United States Patent
Cheng

(10) Patent No.: US 6,544,688 B1
(45) Date of Patent: Apr. 8, 2003

(54) CATHODE CURRENT COLLECTOR FOR ELECTROCHEMICAL CELLS

(75) Inventor: Song Cheng, Tucson, AZ (US)

(73) Assignee: Moltech Corporation, Tucson, AZ (US)

(*) Notice: Subject to any disclaimer, the term of this patent is extended or adjusted under 35 U.S.C. 154(b) by 179 days.

(21) Appl. No.: 09/668,708

(22) Filed: Sep. 20, 2000

(51) Int. Cl.[7] .................................................. H01M 4/66
(52) U.S. Cl. ........................................ 429/245; 429/234
(58) Field of Search ................................ 429/234, 235, 429/245

(56) References Cited

U.S. PATENT DOCUMENTS

| | | |
|---|---|---|
| 4,664,991 A | 5/1987 | Perichaud et al. |
| 4,739,018 A | 4/1988 | Armand et al. |
| 4,833,048 A | 5/1989 | De Jonghe et al. |
| 4,917,974 A | 4/1990 | De Jonghe et al. |
| 5,162,175 A | 11/1992 | Visco et al. |
| 5,194,341 A | 3/1993 | Bagley et al. |
| 5,324,599 A | 6/1994 | Oyama et al. |
| 5,399,447 A | 3/1995 | Chaloner-Gill et al. |
| 5,441,830 A | 8/1995 | Moulton et al. |
| 5,464,707 A | 11/1995 | Moulton et al. |
| 5,478,676 A | 12/1995 | Turi et al. |
| 5,516,598 A | 5/1996 | Visco et al. |
| 5,518,839 A | 5/1996 | Olsen |
| 5,520,850 A | 5/1996 | Chaloner-Gill et al. |
| 5,529,860 A | 6/1996 | Skotheim et al. |
| 5,538,812 A | 7/1996 | Lee et al. |
| 5,578,396 A | 11/1996 | Fauteux et al. |
| 5,588,971 A | 12/1996 | Fauteux et al. |
| 5,591,544 A | 1/1997 | Fauteux et al. |
| 5,601,947 A | 2/1997 | Skotheim et al. |
| 5,690,702 A | 11/1997 | Skotheim et al. |
| 5,723,230 A | 3/1998 | Naoi et al. |
| 5,783,330 A | 7/1998 | Naoi et al. |
| 5,792,575 A | 8/1998 | Naoi et al. |
| 5,827,615 A | 10/1998 | Touhsaent et al. |
| 5,882,819 A | 3/1999 | Naoi et al. |
| 5,935,724 A | 8/1999 | Spillman et al. |
| 5,935,728 A | 8/1999 | Spillman et al. |
| 6,069,221 A | 5/2000 | Chassar et al. |
| 6,117,590 A | 9/2000 | Skotheim et al. |
| 6,153,337 A | 11/2000 | Carlson et al. |
| 6,183,901 B1 | 2/2001 | Ying et al. |
| 6,194,098 B1 | 2/2001 | Ying et al. |
| 6,201,100 B1 | 3/2001 | Gorkovenko et al. |

FOREIGN PATENT DOCUMENTS

| | | |
|---|---|---|
| WO | WO99/33125 | 7/1999 |
| WO | WO00/36671 | 6/2000 |
| WO | WO00/36674 | 6/2000 |
| WO | WO00/36678 | 6/2000 |
| WO | WO00/67339 | 11/2000 |
| WO | WO00/67340 | 11/2000 |

OTHER PUBLICATIONS

Alamgir et al. "Room Temperature Polymer Electrolytes", *Lithium Batteries, New Materials Developments and Perspectives*, Chapter 3, pp. 93–136, Elsevier, Amsterdam (1994).

Dominey. "Current State of the Art on Lithium Battery Electrolytes", *Lithium Batteries, New Materials, Developments and Perspectives*, Chapter 4, pp. 137–165, Elsevier, Amsterdam (1994).

*Primary Examiner*—Patrick Ryan
*Assistant Examiner*—Gregg Cantelmo
(74) *Attorney, Agent, or Firm*—Jacqueline M. Nicol; Squire, Sanders & Dempsey L.L.P.

(57) ABSTRACT

Provided are cathode current collectors for use in electrochemical cells, wherein the current collector comprises a conductive primer layer applied upon a conductive support, and the primer layer comprises from about 20 to 60% by weight of a crosslinked polymeric material formed from a reaction of a polymeric material having hydroxyl groups and a crosslinking agent, about 2 to 15% by weight of a cationic polymer comprising quaternary ammonium salt groups, and about 35 to 75% by weight of a conductive filler. The present invention also pertains to methods of forming such cathode current collectors for use in electrochemical cells comprising: (i) an anode comprising lithium, and (ii) a cathode comprising an electroactive sulfur-containing material, and electrochemical cells comprising such cathode current collectors.

13 Claims, 3 Drawing Sheets

CATHODE CURRENT COLLECTOR FOR ELECTROCHEMICAL CELLS

TECHNICAL FIELD

The present invention relates generally to the field of electrochemical cells. More particularly, this invention pertains to lithium batteries in which the cathode comprises an electroactive sulfur-containing material and the cathode current collector comprises a conductive support and a crosslinked polymeric conductive primer layer.

BACKGROUND

Throughout this application, various publications, patents, and published patent applications are referred to by an identifying citation. The disclosures of the publications, patents, and published patent specifications referenced in this application are hereby incorporated by reference into the present disclosure to more fully describe the state of the art to which this invention pertains.

As consumer demand for, and reliance upon, portable and hand-held electronic devices such as mobile telephones, portable computers, pagers and palm pilots has grown, so has the need for portable power supplies, such as rechargeable batteries, with long cycle life, rapid recharge capacity, and high energy density become more important. There has been considerable interest in recent years in developing high energy density primary and secondary batteries with alkali-metal anode materials, and, in particular, anodes based on lithium.

One component of a battery, especially a rechargeable battery, which is important for long cycle life, rapid charge capacity, and high energy density, is the current collector. In rechargeable lithium batteries, for example, current collectors have typically been constructed of nickel or aluminum. Aluminum is generally preferred due to lower cost and lower density. Unfortunately, current collectors constructed from aluminum exhibit a relatively high interfacial impedance associated with the presence of an oxide layer on the surface, which, in turn, results in a loss of energy and reduced power. Such losses are generally attributed to the fact that the aluminum surface includes a native oxide layer which (a) acts as an insulator, increasing interfacial impedance, and thus severely limits electrical conductivity, and (b) greatly hinders adhesion of electrochemically active electrode materials which are to be applied to the surface of the aluminum current collector during electrode fabrication.

Two approaches have been presented to improve aluminum current collector functioning. One approach emphasizes primer layers on the aluminum with improved adhesion, and a second approach emphasizes reduction of interfacial resistance at the aluminum interface. In the first approach, polymers containing carboxylic acid functionality have been found to provide strong adhesion to aluminum metal surfaces. For example, in U.S. Pat. No. 5,827,615, Touhsaent et al. show that adhesion of polyvinyl alcohol polymers to aluminum films is improved by the use of carboxylic acid containing polymers in the formulation, such as olefin-maleic acid copolymers. Chassar et al., in U.S. Pat. No. 6,069,221, report that a carboxylic acid function in polymer formulations improves adhesion to metals, particularly aluminum. Similarly, in U.S. Pat. Nos. 5,441,830 and 5,464,707 to Moulton et al., the adhesion-promoting properties of carboxylic acid functionality is described in an electrically conducting primer layer material. In U.S. Pat. Nos. 5,399,447 and 5,520,850 to Chaloner-Gill et al. is described an adhesion promoting layer containing conducting material and a polymer, such as a polyacrylic acid, and a lithium salt to reduce acidity and reactivity to a lithium anode. An example of a conductive primer layer for a current collector from a crosslinked polymer from a crosslinking reaction of a polymer having pendant carboxyl groups, such as ethylene/acrylic acid polymers, with a multifunctional crosslinking agent, is described in U.S. Pat. No. 5,478,676 to Turi et al.

Improved current collector performance by reduction of interfacial resistance has been described, for example, in U.S. Pat. Nos. 5,578,396, 5,591,544, and 5,588,971 to Fauteux et al., by freeing the surface of an aluminum current collector of oxide, etching the surface with a carboxylic acid material to improve adhesion, and providing a primer, such as graphite, to prevent re-growth of the oxide layer. Although carboxylic acid polymers may provide excellent adhesion to aluminum current collectors, problems of corrosion of the aluminum by cell components may still exist.

Another approach to reduce the corrosion of aluminum current collectors is described in U.S. Pat. No. 5,518,839, to Olsen, in which a layer of a corrosion resistant metal, such as nickel, copper, chromium, titanium, or mixtures thereof, is applied to an etched aluminum current collector surface. Such an approach, however, adds an additional process step and adds weight and cost to the cell.

It is thus an object of the present invention to provide a current collector and method of manufacturing same, wherein the current collector has a substantially reduced interfacial impedance and substantially increased adhesive capabilities.

SUMMARY OF THE INVENTION

The cathode current collector of the present invention for use in an electrochemical cell comprises: (a) a conductive support, and (b) a conductive primer layer overlying the conductive support, wherein the primer layer comprises from about 20 to 60% by weight of a crosslinked polymeric material formed from a reaction of a polymeric material having hydroxyl groups and a crosslinking agent, about 2 to 15% by weight of a cationic polymer comprising quaternary ammonium salt groups, and about 35 to 75% by weight of a conductive filler. In a preferred embodiment, the cell comprises: (i) an anode comprising lithium, and (ii) a cathode comprising an electroactive sulfur-containing material.

Suitable polymeric materials having hydroxyl groups include, but are not limited to, polyvinyl alcohol, polyvinyl butyral, polyvinyl formal, vinyl acetate-vinyl alcohol copolymers, ethylene-vinyl alcohol copolymers, and vinyl alcohol-methyl methacrylate copolymers. The crosslinking agent is preferably selected from the group consisting of phenolic resins, epoxides, melamine resins, polyisocyanates, and dialdehydes. The cationic polymer comprising quaternary ammonium salt groups is preferably selected from the group consisting of poly(diallyldimethylammonium) salts, copolymers of acrylamide and diallyldimethylammonium salts, copolymers of diacetone acrylamide and diallyldimethylammonium salts, copolymers of N-methylolacrylamide and diallyldimethylammonium salts, polyvinyl benzyl trimethyl ammonium salts, salts of polyepichlorohydrin quaternized with trimethyl amine, polymethacrylamidopropyltrimethyl ammonium salts, polymethacryloyloxyethyltrimethyl ammonium salts, and polymethacryloyloxyethyl dimethyl hydroxyethyl ammonium salts. The conductive filler is preferably selected from the group consisting of carbon black, graphites, activated carbon fibers, non-activated carbon nanofibers, metal flakes, metal powders, and electrically conductive polymers. The conductive support is preferably selected from the group consisting of aluminum foil and aluminized plastic films.

In one embodiment of the present invention, the weight ratio of the polymeric material having hydroxyl groups to the crosslinking agent in the crosslinked polymeric material is from 10:1 to 2:1. Preferably, the thickness of the conductive primer layer is from about 0.2 to 5 microns.

In one embodiment, the electroactive sulfur-containing material comprises elemental sulfur. In another embodiment, the electroactive sulfur-containing material, in its oxidized state, comprises a polysulfide moiety of the formula, $S_m$, wherein m is an integer equal to or greater than 3. In yet another embodiment, the electroactive sulfur-containing material comprises a sulfur-containing organic polymer.

Another aspect of the present invention pertains to methods of preparing a cathode current collector of an electrochemical cell, wherein the current collector, as described herein, is formed by the steps of: (a) coating onto a conductive support a liquid mixture comprising a polymeric material having hydroxyl groups, a crosslinking agent, a cationic polymer comprising quaternary ammonium salt groups, a conductive filler, and a liquid medium; and (b) drying and crosslinking the coating formed in step (a) to yield the current collector. The drying and crosslinking step (b) is preferably performed at a temperature of from about 60° C. to about 170° C.

In one embodiment, the liquid medium comprises water. In another embodiment, the liquid medium comprises one or more organic solvents.

DETAILED DESCRIPTION OF THE INVENTION

Figure 1:
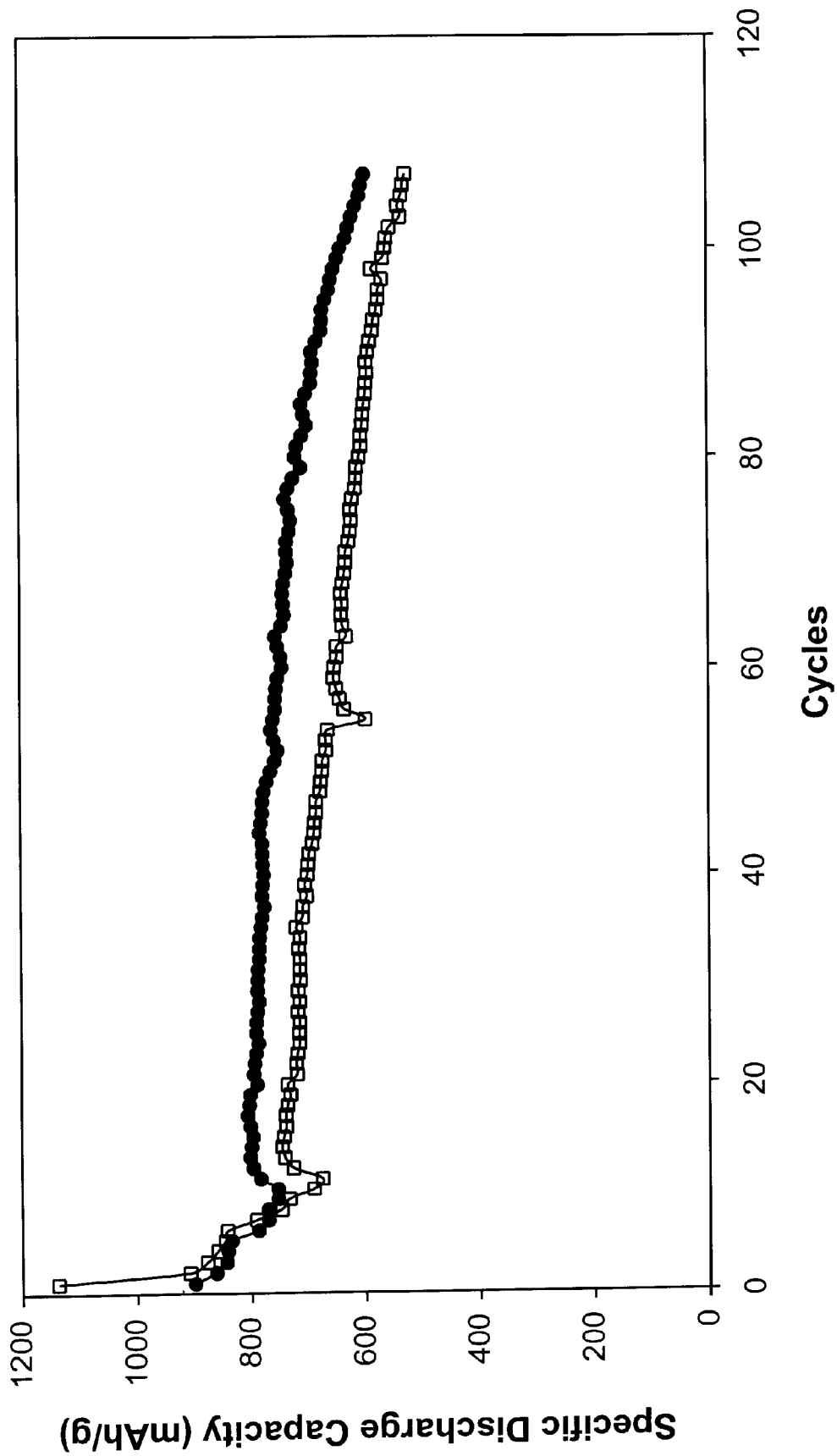
FIG. 1 shows the specific discharge capacity (mAh/g) vs. cycle number for cells of Example 4(•) and cells of Comparative Example 7(□).

One aspect of the present invention pertains to a cathode current collector of an electrochemical cell, wherein the current collector comprises: (a) a conductive support, and (b) a conductive primer layer overlying the conductive support, comprising a crosslinked polymeric material formed from a reaction of a polymeric material having hydroxyl groups and a crosslinking agent, a cationic polymer comprising quaternary ammonium salt groups, and a conductive filler; and wherein the cell comprises: (i) an anode comprising lithium, and (ii) a cathode comprising an electroactive sulfur-containing material. In particular the cathode current collectors of the present invention provide improved impedance and increased adhesion of the cathode active layer of the cathode.

Current Collectors

The conductive primer layer of the current collector of the present invention comprises a crosslinked polymeric material formed from a reaction of a polymeric material having hydroxyl groups. Suitable polymeric materials having hydroxyl groups include, but are not limited to, those selected from the group consisting of polyvinyl alcohol, polyvinyl butyral, polyvinyl formal, vinyl acetate-vinyl alcohol copolymers, ethylene-vinyl alcohol copolymers, and vinyl alcohol-methyl methacrylate copolymers. The amount of hydroxyl groups in the polymeric materials may vary over a range from about 10 mole % to 100 mole % of the monomer units in the polymeric material. The molecular weight of suitable polymeric materials having hydroxyl groups may also vary over a wide range, for example, from about 30,000 to about 600,000. Preferred polymers are in the molecular weight range of from 40,000 to 120,000. Preferred polymeric materials are polyvinyl alcohol and derivatives of polyvinyl alcohol. Particularly preferred are polyvinyl alcohol and polyvinyl butyral.

The polymeric materials having hydroxyl groups may be crosslinked by many different crosslinking agents known in the art in forming the polymeric crosslinked materials of the present invention. Suitable crosslinking agents include, but are not limited to, phenolic resins, epoxides, melamine resins, polyisocyanates, and dialdehydes. Preferred crosslinking agents include melamine resins, for example, condensates of melamine with formaldehyde and lower alcohols, such as methanol, ethanol, butanol, and isobutanol. These melamine resins include those sold under the trademark Resimene® by Solutia Inc., St. Louis, Mo. Other preferred crosslinking agents include phenolic resins, for example, condensates of phenol with formaldehyde and lower alcohols, such as methanol, ethanol, butanol, and isobutanol. These phenolic resins include those sold under the trademark SantolinkS, by Solutia Inc., St. Louis, Mo.

The weight ratio of the polymeric material having hydroxyl groups to the crosslinking agent in the crosslinked polymeric material may vary over a wide range for reasons including, the hydroxyl content of the polymer, its molecular weight, the reactivity and functionality of the crosslinking agent, the desired rate of crosslinking, and the temperature at which the crosslinking reaction may occur. A preferred weight ratio is from about 10:1 to about 2:1, and a more preferred weight ratio is from 8:1 to 4:1.

Suitable cationic polymers comprising quaternary ammonium salt groups, of the conductive primer layer include, but are not limited to, poly(diallyldimethylammonium) salts, copolymers of acrylamide and diallyldimethylammonium salts, copolymers of diacetone acrylamide and diallyldimethylammonium salts, copolymers of N-methylolacrylamide and diallyldimethylammonium salts, polyvinyl benzyl trimethyl ammonium salts, salts of polyepichlorohydrin quaternized with trimethyl amine, polymethacrylamidopropyltrimethyl ammonium salts, polymethacryloyloxyethyltrimethyl ammonium salts, and polymethacryloyloxyethyl dimethyl hydroxyethyl ammonium salts. Preferred cationic polymers comprising quaternary ammonium salt groups are those of polymers and copolymers of diallyldimethylammonium salts.

With each quaternary ammonium group of the cationic polymers of this invention, there is associated a negatively charged acid salt or anion. This anion may be any anion which does not have a detrimental reaction with the electroactive cathode material or other materials of the cell that the anion may contact. Monovalent anions are preferred because multivalent anions in the cationic polymer, during processing to form the conductive primer layer, tend to interfere with the solubility and uniformity of the polymer in the coating mixture. Particularly preferred anions are those anions which are associated with the quaternary ammonium group in their preparation to avoid the expense of an added anion exchange step. Most preferred negatively charged acid salts or anions are $Cl^-$, $Br^-$, and methosulfate.

Suitable conductive fillers of the conductive primer layer include, but are not limited to, conductive carbons, such as, carbon black and graphite, graphite fibers, activated carbon fibers, non-activated carbon nanofibers, carbon fabrics, metal flakes, metal powders, metal fibers, metal mesh, and electrically conductive polymers. Preferred fillers are conductive carbons such as carbon black and graphite.

A range of ratios of the conductive primer layer components can provide the desired adhesion and desired conductivity. In one embodiment, the conductive primer layer comprises from about 20 to 60% by weight of a crosslinked polymeric material preferably formed from a reaction of a polymeric material having hydroxyl groups and a crosslinking agent, about 2 to 15% by weight of a cationic polymer comprising quaternary ammonium salt groups, and about 35 to 75% by weight of a conductive filler. In a preferred embodiment, the conductive primer layer comprises from 30 to 50% by weight of the crosslinked polymeric material. In a preferred embodiment, the conductive primer layer comprises from 2 to 10% by weight of a cationic polymer comprising quaternary ammonium salt groups. In a preferred embodiment, the conductive primer layer comprises from 40 to 65 % by weight of a conductive filler. The crosslinking agents of the present invention may also react with the cationic polymers comprising quaternary ammonium salt groups, such as for example, copolymers of diacetone acrylamide and diallyldimethylammonium salts, and copolymers of N-methylolacrylamide and diallyldimethylammonium salts, in a crosslinking reaction.

In one embodiment of the present invention, the conductive primer layer coated on the conductive support is from 0.2 to 5 microns in thickness. In a preferred embodiment, the conductive primer layer coated on the conductive support is from 0.5 to 3 microns in thickness, and in a more preferred embodiment is from 0.75 to 2.5 microns in thickness.

The conductive support of the current collector upon which the conductive primer layer is coated includes, but is not limited to, those selected from the group consisting of metallized plastic films, metal foils, metal grids, expanded metal grids, metal mesh, metal wool, woven carbon fabric, woven carbon mesh, non-woven carbon mesh, and carbon felt. Preferred conductive supports include aluminum foil and aluminized plastic films, such as aluminized polyester film.

The present invention provides a method of making a current collector for an electrochemical cell, wherein the current collector comprises a conductive support and a conductive primer layer. One aspect of the method of the present invention comprises the steps of: (a) coating onto a conductive support a liquid mixture comprising a polymeric material having hydroxyl groups, a crosslinking agent, a cationic polymer comprising quaternary ammonium groups, a conductive filler, and a liquid medium; and (b) drying and crosslinking the coating to yield a current collector comprising a conductive primer layer.

Examples of suitable liquid media for the preparation of the conductive primer layers of the current collectors of the present invention include aqueous liquids, non-aqueous liquids, and mixtures thereof. In one embodiment, the liquid medium comprises water. In one embodiment, the liquid medium comprises one or more organic solvents.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to the conductive supports by any of a variety of coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying. The drying and crosslinking step may be performed at a range of temperatures. Suitable temperatures are those above which the liquid medium becomes volatile, typically above the boiling point, and also above which the crosslinking reaction between the polymeric material having hydroxyl groups and the crosslinking agent occurs at an acceptable rate. Suitable temperatures are also below those at which the conductive support, for example, a metallized plastic film, may be deformed or damaged. In one embodiment of the present invention, the drying and crosslinking step is performed at a temperature of from about 60° C. to about 170° C. In a preferred embodiment, the drying and crosslinking step is performed at a temperature from 80° C. to 140° C.

The conductive primer layers of the current collectors of the present invention possess excellent adhesion to a conductive support, such as for example, an aluminum foil or an aluminized plastic film. At the same time the current collectors of the present invention comprising conductive primer layers adhere to cathodes comprising electroactive sulfur-containing materials. The resulting cathode active layer-current collector combinations exhibit low impedance.

The current collectors of the present invention, for example, as described in Example 1 and Example 3, comprising a crosslinked hydroxyl containing polymer and a cationic polymer comprising quaternary ammonium salt groups, fabricated into the cathodes of Examples 4 and 8, respectively, show impedances of 23 ohms and 43 ohms, respectively, as shown in Table 1. The current collector of Comparative Example 2 from a crosslinked carboxyl containing polymer, but lacking a cationic polymer comprising quaternary ammonium salt groups, fabricated into the cathode of Comparative Example 8, shows a significantly higher impedance of 78 ohms. The current collector of Comparative Example 3, from a crosslinked hydroxyl containing polymer but lacking the cationic polymer comprising quaternary ammonium salt groups of the current collectors of the present invention, fabricated into the cathode of Comparative Example 11, also shows a higher impedance of 48 ohms. The current collector of Comparative Example 6, from a hydroxyl containing polymer but without crosslinking and lacking the cationic polymer comprising quaternary ammonium salt groups of the current collectors of the present invention, fabricated into the cathode of Comparative Example 10, lacks adhesion as observed by the delamination upon drying.

The excellent adhesion properties of carboxyl containing polymers to aluminum are well established, for example, as described in U.S. Pat. No. 6,069,221 to Chassar et al. and in U.S. Pat. Nos. 5,441,830 and 5,464,707 to Moulton et al. In fact, as shown in U.S. Pat. No. 5,827,615 to Touhsaent et al., the addition of carboxyl containing polymers to the hydroxyl containing polymer, polyvinyl alcohol, improves the adhesion to aluminum because carboxyl containing polymers adhere to aluminum more strongly than hydroxyl containing polymers. It is also known that materials containing chloride ions are corrosive to aluminum, such as in current collectors. It is, therefore, unexpected that a combination of a hydroxyl containing polymer and a chloride ion containing polymer would exhibit excellent adhesion and at the same time be free of corrosion problems.

While not wishing to be bound by any theory, the excellent adhesion properties of the primer coating and the low impedance of the current collectors of the present invention may be a result of the quaternary ammonium polymer disrupting the oxide layer on the aluminum surface which on the one hand reduces the impedance and on the other enhances the adhesion between the hydroxyl-containing polymer and the aluminum surface.

Cathode Active Layers

The cathode active layers of the cells of the present invention comprise an electroactive sulfur-containing material. These cathode active layers are coated onto substrates such as the current collectors of the present invention, to form composite cathodes. The term "electroactive sulfur-containing material," as used herein, relates to cathode active materials which comprise the element sulfur in any form, wherein the electrochemical activity involves the breaking or forming of sulfur-sulfur covalent bonds. Examples of suitable electroactive sulfur-containing materials include, but are not limited to, elemental sulfur and organic materials comprising both sulfur atoms and carbon atoms, which may or may not be polymeric. Suitable organic materials include those further comprising heteroatoms, conductive polymer segments, composites, and conductive polymers.

In one preferred embodiment, the electroactive sulfur-containing material comprises elemental sulfur. In one preferred embodiment, the electroactive sulfur-containing material comprises a mixture of elemental sulfur and a sulfur-containing polymer.

In another embodiment, the sulfur-containing material, in its oxidized state, comprises a polysulfide moiety, $S_m$, selected from the group consisting of covalent —$S_m$— moieties, ionic —$S_m^-$ moieties, and ionic $S_m^{2-}$ moieties, wherein m is an integer equal to or greater than 3, such as, for example, elemental sulfur and sulfur-containing organic polymers. Examples of sulfur-containing organic polymers include, but not limited to, those described in U.S. Pat. Nos. 5,601,947; 5,690,702; 5,529,860 to Skotheim et al.; U.S. patent application Ser. No. 08/995,122, now U.S. Pat. No. 6,201,100, to Gorkovenko et al.; U.S. Ser. No. 09/033,218, now U.S. Pat. No. 6,117,590, to Skotheim et al.; U.S. Ser. No. 09/565,187 to Movchan et al.; and U.S. Ser. No. 09/565,184 to Kovalev et al., all of the common assignee, and incorporated herein by reference in their entirety. Other suitable electroactive sulfur-containing materials comprising polysulfide linkages include, but are not limited to, those described in U.S. Pat. No. 4,664,991 to Perichaud et al., and in U.S. Pat. Nos. 5,723,230; 5,783,330; 5,792,575; and 5,882,819 to Naoi et al.

In one embodiment, m of the polysulfide moiety, $S_m$, of the sulfur-containing polymer is an integer equal to or greater than 6. In one embodiment, m of the polysulfide moiety, $S_m$, of the sulfur-containing polymer is an integer equal to or greater than 8. In one embodiment, the sulfur-containing polymer has a polymer backbone chain and the polysulfide moiety, $S_m$, is covalently bonded by one or both of its terminal sulfur atoms on a side group to the polymer backbone chain. In one embodiment, the sulfur-containing polymer has a polymer backbone chain and the polysulfide moiety, $S_m$, is incorporated into the polymer backbone chain by covalent bonding of the terminal sulfur atoms of the polysulfide moiety.

Still further examples of electroactive sulfur-containing materials include those comprising disulfide groups as described, for example, in U.S. Pat. No. 4,739,018 to Armand et al.; U.S. Pat. Nos. 4,833,048 and 4,917,974, both to De Jonghe et al.; U.S. Pat. Nos. 5,162,175 and 5,516,598, both to Visco et al.; and U.S. Pat. No. 5,324,599 to Oyama et al.

Preferably, the electroactive sulfur-containing material comprises greater than 50% by weight of sulfur. More preferably, the electroactive sulfur-containing material comprises greater than 75% by weight of sulfur, and most preferably, the electroactive sulfur-containing material comprises greater than 90% by weight of sulfur.

The electroactive sulfur-containing cathodes of the present invention may further comprise electroactive metal chalcogenides, electroactive conductive polymers, and combinations thereof.

The cathode active layers may further comprise one or more conductive fillers to provide enhanced electronic conductivity. Examples of conductive fillers include, but are not limited to, those selected from the group consisting of conductive carbons, graphites, activated carbon fibers, non-activated carbon nanofibers, metal flakes, metal powders, metal fibers, and electrically conductive polymers. The amount of conductive filler, if present, is preferably in the range of 2 to 30% by weight.

The cathode active layers may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, those selected from the group consisting of polytetrafluoroethylenes (Teflon®), polyvinylidene fluorides ($PVF_2$ or PVDF), ethylene-propylene-diene (EPDM) rubbers, polyethylene oxides (PEO), UV curable acrylates, UV curable methacrylates, and heat curable divinyl ethers, and the like. Other suitable binders include crosslinked polymers, such as those made from polymers having carboxyl groups and crosslinking agents. The amount of binder, if present, is preferably in the range of 2 to 30% by weight.

Cathode active layers may be prepared by methods known in the art. For example, one suitable method comprises the steps of: (a) dispersing or suspending in a liquid medium the electroactive sulfur-containing material, as described herein; (b) optionally adding to the mixture of step (a) a conductive filler and/or binder; (c) mixing the composition resulting from step (b) to disperse the electroactive sulfur-containing material; (d) casting the composition resulting from step (c) onto a suitable substrate; and (e) removing some or all of the liquid from the composition resulting from step (d) to provide the cathode active layer.

Examples of suitable liquid media for the preparation of the cathodes include aqueous liquids, non-aqueous liquids, and mixtures thereof. Especially preferred liquids are non-aqueous liquids such as, for example, methanol, ethanol, isopropanol, propanol, butanol, tetrahydrofuran, dimethoxyethane, acetone, toluene, xylene, acetonitrile, and cyclohexane.

Mixing of the various components can be accomplished using any of a variety of methods known in the art so long as the desired dissolution or dispersion of the components is obtained. Suitable methods of mixing include, but are not limited to, mechanical agitation, grinding, ultrasonication, ball milling, sand milling, and impingement milling.

The formulated dispersions can be applied to the current collectors of the present invention by any of a variety of coating methods known in the art and then dried using techniques known in the art. Suitable hand coating techniques include, but are not limited to, the use of a coating rod or gap coating bar. Suitable machine coating methods include, but are not limited to, the use of roller coating, gravure coating, slot extrusion coating, curtain coating, and bead coating. Removal of some or all of the liquid from the mixture can be accomplished by any of a variety of methods known in the art. Examples of suitable methods for the removal of liquid from the mixture include, but are not limited to, hot air convection, heat, infrared radiation, flowing gases, vacuum, reduced pressure, extraction, and by simply air drying.

The method of preparing the cathodes may further comprise heating the electroactive sulfur-containing material to a temperature above its melting point and then resolidifying the melted electroactive sulfur-containing material to form a cathode active layer having redistributed sulfur-containing material of higher volumetric density than before the melting process, for example, as described in PCT Publication No. WO 00/36674 to Xu et al. of the common assignee.

Cathode active layers coated onto the current collectors of the present invention as a substrate, were found to possess good adhesion between the electroactive sulfur-containing material and other materials of the cathode active layer and the conductive primer layer. For example, cells built from cathode active layers comprising binders, such as Example 4, or cathode active layers without binders, such as Examples 6 and 7, show long cycle life which shows that the various layers in the cells have maintained intimate contact. In contrast, for example, cells of Comparative Example 8 and Comparative Example 9, built from the current collectors of Comparative Examples 2 and 5, respectively, show very low capacity and poor adhesion from these cathode materials. While these are preferred cathode active layer materials, the current collectors may also be used with other cell chemistries.

Anodes

Suitable anode active materials, comprising lithium, for the anodes of the present invention include, but are not limited to, lithium metal, such as lithium foil and lithium deposited onto a substrate, such as a plastic film, and lithium alloys, such as lithium-aluminum alloys and lithium-tin alloys. While these are preferred anode active materials, the current collectors may also be used with other cell chemistries.

Electrolytes

The electrolytes used in electrochemical cells function as a medium for the storage and transport of ions, and in the special case of solid electrolytes and gel electrolytes, these materials may additionally function as separator materials between the anode and the cathode. Any liquid, solid, or gel material capable of storing and transporting ions may be used, so long as the material is electrochemically and chemically unreactive with respect to the anode and the cathode, and the material facilitates the transport of lithium ions between the anode and the cathode. The electrolyte must also be electronically non-conductive to prevent short circuiting between the anode and the cathode.

Typically, the electrolyte comprises one or more ionic electrolyte salts to provide ionic conductivity and one or more non-aqueous liquid electrolyte solvents, gel polymer materials, or solid polymer materials. Suitable non-aqueous electrolytes for use in the present invention include, but are not limited to, organic electrolytes comprising one or more materials selected from the group consisting of liquid electrolytes, gel polymer electrolytes, and solid polymer electrolytes, as are known in the art. Examples of non-aqueous electrolytes for lithium batteries are described by Dominey in *Lithium Batteries, New Materials, Developments and Perspectives*, Chapter 4, pp. 137–165, Elsevier, Amsterdam (1994). Examples of gel polymer electrolytes and solid polymer electrolytes are described by Alamgir et al. in *Lithium Batteries, New Materials, Developments and Perspectives*, Chapter 3, pp. 93–136, Elsevier, Amsterdam (1994).

Examples of useful liquid electrolyte solvents include, but are not limited to, non-aqueous organic solvents, such as, for example, N-methyl acetamide, acetonitrile, acetals, ketals, esters, carbonates, sulfones, sulfolanes, aliphatic ethers, cyclic ethers, glymes, polyethers, phosphate esters, siloxanes, dioxolanes, N-alkylpyrrolidones, substituted forms of the foregoing, and blends thereof. Fluorinated derivatives of the foregoing are also useful as liquid electrolyte solvents.

These liquid electrolyte solvents are themselves useful as plasticizers for gel polymer electrolytes. Examples of useful gel polymer electrolyte materials include, but are not limited to, those comprising polymers selected from the group consisting of polyethylene oxides, polypropylene oxides, polyacrylonitriles, polysiloxanes, polyimides, polyphosphazenes, polyethers, sulfonated polyimides, perfluorinated membranes (such as, for example, NAFION™ resins), polydivinyl polyethylene glycols, polyethylene glycol diacrylates, polyethylene glycol dimethacrylates, derivatives of the foregoing, copolymers of the foregoing, crosslinked and network structures of the foregoing, and blends of the foregoing.

Examples of useful solid polymer electrolyte materials include, but are not limited to, those comprising polymers selected from the group consisting of polyethers, polyethylene oxides, polypropylene oxides, polyimides, polyphosphazenes, polyacrylonitriles, polysiloxanes, derivatives of the foregoing, copolymers of the foregoing, crosslinked and network structures of the foregoing, and blends of the foregoing. These solid polymer electrolyte materials may contain a liquid electrolyte solvent, typically at a level of less than 20% by volume of the total electrolyte.

Ionic electrolyte salts are added to the electrolyte to increase the ionic conductivity. Examples of ionic electrolyte salts for use in the present invention include, but are not limited to, LiSCN, LiBr, LiI, LiClO$_4$, LiAsF$_6$, LiSO$_3$CF$_3$, LiSO$_3$CH$_3$, LiBF$_4$, LiB(Ph)$_4$, LiPF$_6$, LiC(SO$_2$CF$_3$)$_3$, and LiN(SO$_2$CF$_3$)$_2$. Other electrolyte salts us invention include lithium polysulfides (Li$_2$S$_x$), and lithium salts of organic ionic polysulfides (LiS$_x$R)$_z$, where x is an integer from 1 to 20, z is an integer from 1 to 3, and R is an organic group, and those disclosed in U.S. Pat. No. 5,538,812 to Lee et al. Preferred ionic electrolyte salts are LiBr, LiI, LiSCN, LiBF$_4$, LiPF$_6$, LiAsF$_6$, LiSO$_3$CF$_3$, LiN(SO$_2$CF$_3$)$_2$, and LiC(SO$_2$CF$_3$)$_3$.

Separators

The electrochemical cells of the present invention may further comprise a separator interposed between the cathode and anode. Typically, the separator is a solid non-conductive or insulative material which separates or insulates the anode and the cathode from each other and which permits the transport of ions between the anode and the cathode.

The pores of the separator may be partially or substantially filled with electrolyte. Separators may be supplied as porous free standing films which are interleaved with the anodes and the cathodes in the fabrication of electrochemical cells. Alternatively, the porous separator layer may be applied directly to the surface of one of the electrodes, for example, as described in U.S. patent application Ser. No. 08/995,089, now U.S. Pat. No. 6,153,337, to Carlson et al., U.S. patent application Ser. Nos 09/215,029, 09/399,967, and 09/447,901, now U.S. Pat. Nos. 6,194,098, 6,183,201, and 6,277,514 respectively, to Ying et al., all of the common assignee, and in U.S. Pat. No. 5,194,341 to Bagley et al.

A variety of separator materials are known in the art. Examples of suitable solid porous separator materials include, but are not limited to, polyolefins, such as, for example, polyethylenes and polypropylenes, glass fiber filter papers, and ceramic materials. Further examples of separators and separator materials suitable for use in this invention are those comprising a microporous pseudo-boehmite layer, which may be provided either as a free standing film or by a direct coating application on one of the electrodes, as described in PCT Publication No. WO 99/33125, by Carlson et al. of the common assignee. Solid polymer electrolytes and gel polymer electrolytes may also function as a separator in addition to their electrolyte function.

In one embodiment, the solid porous separator is a porous polyolefin separator. In one embodiment, the solid porous separator comprises a microporous xerogel layer, such as, for example, a microporous pseudo-boehmite layer.

Cells and Batteries

Cells or batteries of the present invention comprising current collectors, as described herein, may be made in a variety of sizes and configurations which are known to those skilled in the art. These battery design configurations include, but are not limited to, planar, prismatic, jelly roll, w-fold, stacked and the like. Although the methods of the present invention are particularly suitable for use with thin film electrodes, they may nevertheless be beneficial in thick film designs. Alternatively, designs incorporating both low and high surface area regions, as described in U.S. Pat. Nos. 5,935,724 and 5,935,728 to Spillman et al., can be incorporated into jellyroll and other configurations.

Thin film electrodes may be configured into prismatic designs. With the drive to conserve weight, thin film barrier materials are particularly preferred, e.g., foils. For example, PCT Publication No. WO 00/36678 (International Application No. PCT/US99/30133) to Thibault et al. of the common assignee describes methods for preparing prismatic cells in which suitable barrier materials for sealed casing, methods of filling cells with electrolyte, and methods of sealing the casing, are described.

EXAMPLES

Several embodiments of the present invention are described in the following examples, which are offered by way of illustration and not by way of limitation.

Example 1

A cathode current collector was fabricated by coating a conductive primer layer on both sides of aluminum foil. A primer slurry containing 6.5% of solids in deionized water was prepared by dispersing Airvol 425 (a trade name for polyvinyl alcohol available from Air Products and Chemicals, Allentown, Pa.), 35 parts by weight; poly (acrylamide-co-diallyldimethylammonium chloride) (available from Aldrich Chemical Company, Milwaukee, Wis.), 5 parts by weight; Resimene® AQ7550 (a trade name for melamine-formaldehyde resin crosslinker available from Solutia Inc., St. Louis, Mo.), 10 parts by weight; and Vulcan XC72R (a trade name for conductive carbon available from Cabot Corporation, Tuscola, Ill.), 50 parts by weight. The slurry was coated by a slot die coater onto both sides of a 12 micron thick aluminum foil (available from All-Foils Inc., Brooklyn Heights, Ohio) at a web speed of 20 feet/minute. The coating was dried in the ovens (infrared drying) on the slot die coater at a web temperature estimated to reach 130° C. The resulting dry conductive primer layer had a thickness of about 2 microns on each side of the aluminum foil.

Example 2

The primer formulation as described in Example 1 was coated as described in Example 1 on both sides of a 12 micron thick polyester (PET) film with a 50 nm aluminum layer deposited on both sides (available from Steiner Film Company, Williamstown, Mass.).

Example 3

A cathode current collector was fabricated by coating a conductive primer layer with high cationic polymer content, on both sides of an aluminum foil. A primer slurry containing 6.5% of solids in deionized water was prepared by dispersing Airvol 425, 25 parts by weight; poly(acrylamide-co-diallyldimethylammonium chloride), 15 parts by weight; Resimene® AQ7550, 10 parts by weight; and Vulcan XC72R, 50 parts by weight. The slurry was coated on both sides of a 12 micron thick aluminum foil as described in Example 1.

Comparative Example 1

A 18 micron thick conductive carbon coated aluminum foil commercially available from Rexam Graphics, South Hadley, Mass. (Product No. 60303), in which the conductive carbon layer comprises a crosslinked polymer layer, was used as a current collector.

Comparative Example 2

A conductive primer layer comprising a crosslinked polymer material having pendant carboxylic acid groups crosslinked with a multifunctional crosslinking agent similar to that described in U.S. Pat. No. 5,478,676 was coated on an aluminum foil for use as a current collector.

A primer slurry having a solids content of 15% was prepared in a solvent mixture of isopropanol/water/2-methoxy-1-propanol/dimethylethanolamine (90:8:1:1 by weight) by dispersing 47 parts by weight of TA22-8 resin (a trade name for an acrylate-acrylic acid copolymer available from Dock Resins Corporation, Linden, N.J.), 6 parts by weight of Ionac PFAZ-322 (a trade name for a polyfunctional aziridine crosslinking agent available from Sybron Chemicals Inc., Birmingham, N.J.), and 47 parts by weight of Vulcan XC72R. The slurry was coated on both sides of a 12 micron thick aluminum foil as described in Example 1.

Comparative Example 3

A cathode current collector was fabricated by coating a conductive primer layer, with no cationic polymer, on both sides of aluminum foil. A primer slurry containing 6.5% of solids in deionized water was prepared by dispersing Airvol 425, 40 parts by weight; Resimene® AQ7550, 10 parts by weight; and Vulcan XC72R, 50 parts by weight. The slurry was coated on both sides of a 12 micron thick aluminum foil as described in Example 1.

Comparative Example 4

Dispersion of 42 parts by weight of TA22-8 resin, 6 parts by weight of Ionac PFAZ-322, 5 parts by weight of poly (acrylamide-co-diallyldimethylammonium chloride), and 47 parts by weight of Vulcan XC72R was attempted in water, in ethanol, and in water/ethanol mixtures. Coagulation occurred in each of the solvent systems, and it was not possible to obtain a dispersion for use as a primer coating.

Comparative Example 5

A cathode current collector was fabricated by coating a conductive primer layer, without crosslinking agent and without a cationic polymer, on both sides of aluminum foil. A primer slurry having a solids content of 16% was prepared in a 80:15:5 (by weight) solvent mixture of isopropanol/water/2-methoxy-1-propanol by dispersing 15 parts by weight of Mowital B60H (a trade name for polyvinyl butyral available from Clariant GmbH, Frankfurt, Germany), 36 parts by weight of TA22-8 resin, and 49 parts by weight of Vulcan XC72R. The slurry was coated on both sides of a 12 micron thick aluminum foil as described in Example 1.

Comparative Example 6

A cathode current collector was fabricated by coating a conductive primer layer, without crosslinking agent and without a cationic polymer, on both sides of aluminum foil. A primer slurry having a solids content of 10% was prepared in a solvent mixture of 40:60 ethanol/water by dispersing 44 parts by weight of Airvol 425 resin and 56 parts by weight of Vulcan XC72R. The slurry was coated on both sides of a 12 micron thick aluminum foil as described in Example 1. The resulting dry primer coating had a thickness of about 2 microns on the aluminum foil.

Example 4

A composite cathode was prepared by coating a current collector with a cathode active layer. A cathode slurry was prepared from 70 parts by weight of elemental sulfur (available from Aldrich Chemical Company, Milwaukee, Wis.), 15 parts by weight of Printex XE-2 (a trade name for conductive carbon available from Degussa Corporation, Akron, Ohio), 10 parts by weight of graphite (available from Fluka/Sigma-Aldrich, Milwaukee, Wis.), 4 parts by weight of TA22-8 resin, and 1 part by weight of Ionac PFAZ-322. The solids content of the slurry was 14% by weight in a solvent mixture of 80% isopropanol, 12% water, 15% 1-methoxy-2-propanol and 3% dimethylethanolamine (on a weight basis). The slurry was coated by a slot die coater onto both sides of the current collector of Example 1. The coating was dried in the ovens of the slot die coater. The resulting dry cathode active layer had a thickness of about 20 microns on each side of the current collector, with a loading of electroactive cathode material of about 1.1 mg/cm$^2$.

Figure 2:
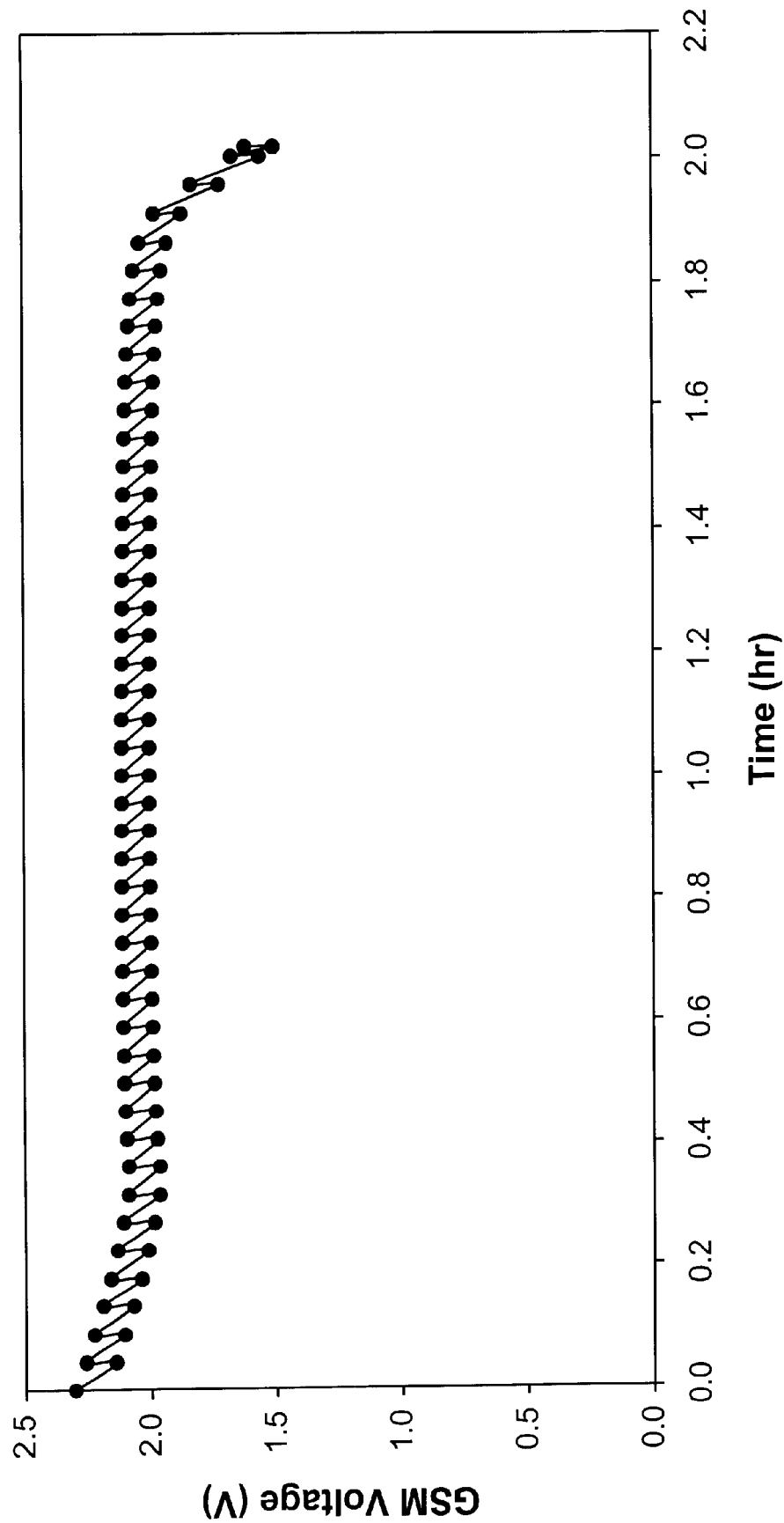
FIG. 2a shows the GSM voltage vs. time for the cells of Example 4(•)
FIG. 2b shows the GSM voltage vs. time for the cells of Comparative Example 7(□).
Figure 2:
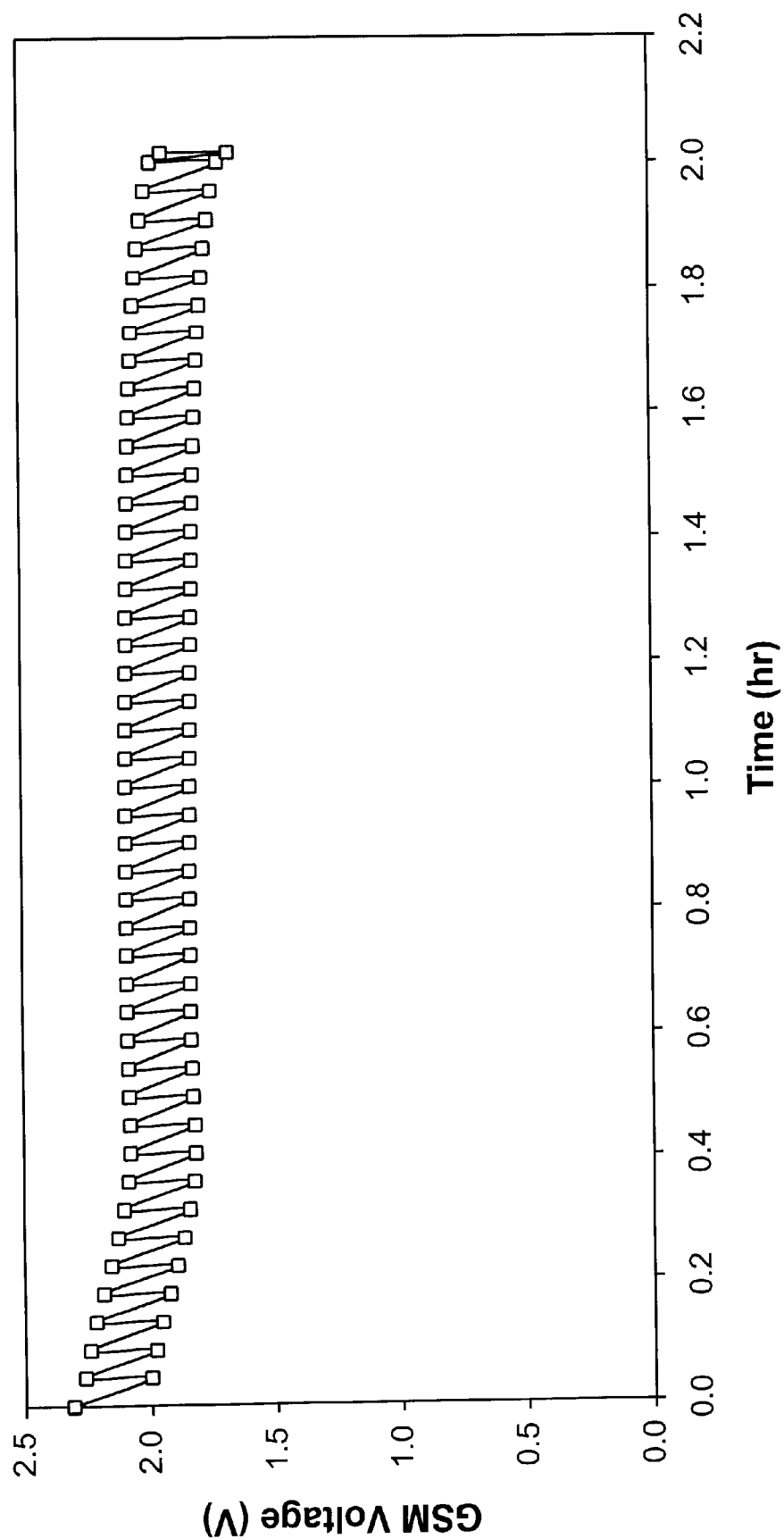

Prismatic cells were fabricated using the coated composite cathode. The anode was lithium foil of about 50 microns in thickness. The electrolyte was a 1.4 M solution of lithium bis(trifluoromethylsulfonyl)imide, (lithium imide, available from 3M Corporation, St. Paul, Minn.) in a 41.5:58.5 volume ratio mixture of 1,3-dioxolane and 1,2-dimethoxyethane. The porous separator used was 16 micron E25 SETELA (a trademark for a polyolefin separator available from Mobil Chemical Company, Films Division, Pittsford, N.Y.). The above components were combined into a layered structure of cathode/separator/anode, which was wound and compressed, with the liquid electrolyte filling the void areas of the separator and cathode to form prismatic cells with an electrode area of about 840 cm$^2$. Discharge-charge cycling of these cells was done at 0.42/0.24 mA/cm$^2$, respectively, with discharge cutoff at a voltage of 1.5V and charge cutoff at 2.8V with 110% overcharge. A GSM test was applied at the $6^{th}$–$10^{th}$ cycles, with 2.0 A and 0.15 A pulses. Specific discharge capacity at the $5^{th}$ cycle was 840 mAh/g, and at the $70^{th}$ cycle was 740 mAh/g, as shown in FIG. 1. The GSM polarization of the cells at the $8^{th}$ cycle was 110 mV as shown in FIG. 2a.

Example 5

The cathode formulation described in Example 4 was coated on both sides of the primer-coated current collector of Example 2. The method of Example 4 was used in cell fabrication and to prepare prismatic cells.

Example 6

A cathode slurry was prepared from 65 parts by weight of elemental sulfur, 15 parts by weight of Printex XE-2, 15 parts by weight of graphite, and 5 parts by weight of Cab-O-Sil TS530 (a trade name for filmed silica available from Cabot Corporation, Tuscola, Ill.). The solids content of the slurry was 13% by weight in isopropanol. This slurry was coated on the current collector of Example 1 by the procedure of Example 4 and dried at 120° C. The cathode active layer had a loading of electroactive cathode material of about 1.1 mg/cm$^2$. The method of Example 4 was used in cell fabrication and to prepare prismatic cells. The test conditions of Example 4 were used for cell testing. Specific discharge capacity at the $5^{th}$ cycle was 930 mAh/g, at the $60^{th}$ cycle was 715 mAh/g, and at the $100^{th}$ cycle was 666 mAh/g.

Example 7

A cathode slurry was prepared from 75 parts by weight of elemental sulfur, 20 parts by weight of Printex XE-2, and 5 parts by weight of PYROGRAF III (a trade name for carbon nanofibers available from Applied Sciences, Inc., Cedarville, Ohio.). The solids content of the slurry was 12% by weight in isopropanol. The slurry was mixed, coated and thermally treated by the method of Example 6. The cathode active layer had a loading of electroactive cathode material of about 1.1 mg/cm$^2$. The method of Example 4 was used in cell fabrication and to prepare prismatic cells. The test conditions of Example 4 were used for cell testing. Specific discharge capacity at the $5^{th}$ cycle was 1030 mAh/g, at the $60^{th}$ cycle was 770 mAh/g, and at the $100^{th}$ cycle was 750 mAh/g.

Example 8

The cathode formulation of Example 4 was coated on the current collector of Example 3 using a hand-drawn procedure. Good adhesion was observed between the cathode material and the current collector.

Comparative Example 7

The cathode formulation of Example 4 was coated on the current collector of Comparative Example 1. Fabrication, cell construction and cell test procedures were those of Example 4. The loading of electroactive cathode material was 1.15 mg/cm².

Specific discharge capacity at the 5$^{th}$ cycle was 790 mAh/g, and at the 70$^{th}$ cycle was 695 mAh/g, as shown in FIG. 1. The GSM polarization of the cells at the 8$^{th}$ cycle was 260 mV as shown in FIG. 2b.

Comparative Example 8

The cathode formulation of Example 4 was coated on the current collector of Comparative Example 2. Fabrication, cell construction and cell test were the same as in Example 4. The loading of electroactive cathode material was 1.15 mg/cm². Specific discharge capacity at the 5$^{th}$ cycle was 445 mAh/g and at the 60$^{th}$ cycle was 240 mAh/g.

Comparative Example 9

The current collector of Comparative Example 5 was coated with the cathode formulation of Example 4. Cell construction used the procedure of Example 4. The loading of electroactive cathode material was about 1.1 mg/cm².

Discharge and charge of the cells under the conditions of Example 4 was attempted. The 1$^{st}$ cycle had a specific discharge capacity of approximately 700 mAh/g but the cell discharge capacity became 0 mAh/g on the attempted 2$^{nd}$ cycle. Although the primer coating had good adhesion to the aluminum foil and provided good adhesion to the cathode active layer initially, cell analysis indicated delamination at the primer-aluminum interface after a single discharge.

Comparative Example 10

The cathode formulation of Example 4 was coated on the current collector of Comparative Example 6, and major delamination occurred at the primer-aluminum interface upon drying.

Comparative Example 11

The cathode formulation of Example 4 was coated on the current collector of Comparative Example 3. The AC impedance results are shown in Table 1.

In Table 1 are presented results of measurements of impedance on cathodes of Comparative Examples 7, 8, and 11 and Examples 4 and 8. AC impedance was measured using a Solartron Model 1287/1260 instrument at the frequency of 1 kHz in an electrochemical cell. The surface area of the working electrode (cathode) was 2 cm² with a Li foil counter electrode of equal area. The electrolyte, volume about 3 mL, was that of Example 4, to which was added polysulfide to a concentration of 5 mM.

TABLE I

AC Impedance of Cathodes

| Example | Cationic Polymer Content of Primer | AC Impedance |
| --- | --- | --- |
| Example 4 | 5% | 23 ohms |
| Example 8 | 15% | 43 ohms |
| Comparative Example 11 | 0% | 48 ohms |
| Comparative Example 7 | N/A | 53 ohms |
| Comparative Example 8 | N/A | 78 ohms |

While the invention has been described in detail and with reference to specific embodiments thereof, it will be apparent to one skilled in the art that various changes and modifications can be made without departing from the spirit and scope thereof.

What is claimed is:

1. A cathode current collector of an electrochemical cell, wherein said current collector comprises:
   (a) a conductive support; and
   (b) a conductive primer layer overlying said conductive support, said primer layer comprising from 20 to 60% by weight of a crosslinked polymeric material formed from a reaction of a polymeric material having hydroxyl groups and a crosslinking agent, 2 to 15% by weight of a cationic polymer comprising quaternary ammonium salt groups, and 35 to 75% by weight of a conductive filler; and wherein said cell comprises:
   (i) an anode comprising lithium; and
   (ii) a cathode comprising an electroactive sulfur-containing material.

2. The current collector of claim 1, wherein said polymeric material having hydroxyl groups is selected from the group consisting of polyvinyl alcohol, polyvinyl butyral, polyvinyl formal, vinyl acetate-vinyl alcohol copolymers, ethylene-vinyl alcohol copolymers, and vinyl alcohol-methyl methacrylate copolymers.

3. The current collector of claim 1, wherein said crosslinking agent is selected from the group consisting of phenolic resins, epoxides, melamine resins, polyisocyanates, and dialdehydes.

4. The current collector of claim 1, wherein said cationic polymer comprising quaternary ammonium salt groups is selected from the group consisting of poly (diallyldimethylammonium) salts, copolymers of acrylamide and diallyldimethylammonium salts, copolymers of diacetone acrylamide and diallyldimethylammonium salts, copolymers of N-methylolacrylamide and diallyldimethylammonium salts, polyvinyl benzyl trimethyl ammonium salts, salts of polyepichlorohydrin quatemized with trimethyl amine, polymethacrylamidopropyltrimethyl ammonium salts, polymethacryloyloxyethyltrimethyl ammonium salts, and polymethacryloyloxyethyl dimethyl hydroxyethyl ammonium salts.

5. The current collector of claim 1, wherein said conductive filler is selected from the group consisting of carbon black, graphites, activated carbon fibers, non-activated carbon nanofibers, metal flakes, metal powders, and electrically conductive polymers.

6. The current collector of claim 1, wherein said conductive support is selected from the group consisting of aluminum foil and aluminized plastic films.

7. The current collector of claim 1, wherein the thickness of said conductive primer layer is from 0.2 to 5 microns.

8. The current collector of claim 1, wherein the thickness of said conductive primer layer is from 0.5 to 3 microns.

9. The current collector of claim 1, wherein said conductive primer layer comprises from 30 to 50% by weight of said crosslinked polymeric material.

10. The current collector of claim 1, wherein said conductive primer layer comprises from 2 to 10% by weight of said cationic polymer comprising quaternary ammonium salt groups.

11. The current collector of claim 1, wherein said conductive primer layer comprises from 40 to 65% by weight of said conductive filler.

12. The current collector of claim 1, wherein the weight ratio of said polymeric material having hydroxyl groups to said crosslinking agent in said crosslinked polymeric material is from 10:1 to 2:1.

13. An electrochemical cell comprising:
  (i) an anode comprising lithium;
  (ii) a cathode comprising an electroactive sulfur-containing material; and
  (iii) a cathode current collector, wherein said current collector comprises:
    (a) a conductive support; and
    (b) a conductive primer layer overlying said conductive support, said primer layer comprising from 20 to 60% by weight of a crosslinked polymeric material formed from a reaction of a polymeric material having hydroxyl groups and a crosslinking agent, 2 to 15% by weight of a cationic polymer comprising quaternary ammonium salt groups, and 35 to 75% by weight of a conductive filler.

* * * * *